US006452323B1

(12) United States Patent
Byrum et al.

(10) Patent No.: US 6,452,323 B1
(45) Date of Patent: Sep. 17, 2002

(54) LUMINOUS GAS DISCHARGE DISPLAY HAVING DIELECTRIC SEALING LAYER

(75) Inventors: Bernard W. Byrum, Perrysburg; David M. Levison, Whitehouse; Robert E. Carter, II, Toledo; Carolyn A. Hamman, Metamora, all of OH (US)

(73) Assignee: Omnion Technologies, Inc., Millbury, OH (US)

( * ) Notice: Subject to any disclaimer, the term of this patent is extended or adjusted under 35 U.S.C. 154(b) by 0 days.

(21) Appl. No.: 09/399,505

(22) Filed: Sep. 20, 1999

(51) Int. Cl.$^{7}$ .................................................. H02J 61/32
(52) U.S. Cl. ......................... 313/483; 313/634; 313/491
(58) Field of Search ................................. 313/483, 491, 313/582, 584, 586, 587, 634, 635, 632

(56) References Cited

U.S. PATENT DOCUMENTS

| | | | | |
|---|---|---|---|---|
| 1,743,569 A | | 1/1930 | Purdom | |
| 1,825,399 A | | 9/1931 | Hotchner | |
| 2,102,049 A | | 12/1937 | Warren | |
| 2,761,087 A | | 8/1956 | Bowtell | |
| 2,852,877 A | | 9/1958 | Goebel et al. | |
| 3,778,127 A | * | 12/1973 | Langston, Jr. et al. | 313/582 |
| 4,584,501 A | | 4/1986 | Cocks et al. | |
| 4,618,802 A | * | 10/1986 | Schrank | 313/512 |
| 4,703,574 A | | 11/1987 | Garjian | |
| 4,839,555 A | | 6/1989 | O'Mahoney | |
| 4,872,741 A | | 10/1989 | Dakin et al. | |
| 4,887,003 A | | 12/1989 | Parker | |
| 4,990,826 A | | 2/1991 | Cocks et al. | |
| 5,036,243 A | | 7/1991 | Cocks et al. | |
| 5,479,069 A | | 12/1995 | Winsor | |
| 5,479,071 A | | 12/1995 | Lynn | |
| 5,767,618 A | | 6/1998 | Maya et al. | |
| 5,811,925 A | | 9/1998 | Anandan et al. | |
| 5,892,326 A | | 4/1999 | Byrum et al. | |
| 5,911,613 A | | 6/1999 | Byrum et al. | |
| 6,118,215 A | * | 9/2000 | Byrum et al. | 313/634 |
| 6,191,841 B1 | * | 2/2001 | Ootaguro et al. | 349/190 |

* cited by examiner

*Primary Examiner*—Vip Patel
*Assistant Examiner*—Joseph Williams
(74) *Attorney, Agent, or Firm*—MacMillan, Sobanski & Todd, LLC

(57) ABSTRACT

A luminous gas discharge display includes two opposing plates hermetically sealed by a layer of material disposed therebetween. A least one of the plates is transparent and at least one of the plates has a channel formed therein which contains an ionizable gas. A pair of electrodes communicate with the channel and are operable to ionize the gas to produce a gas discharge display.

12 Claims, 4 Drawing Sheets

LUMINOUS GAS DISCHARGE DISPLAY HAVING DIELECTRIC SEALING LAYER

BACKGROUND OF THE INVENTION

This invention relates in general to a luminous gas discharge display and in particular to a luminous display such as a sign employing a gas discharge and a method of manufacturing such a display.

Luminous signs employing a gaseous discharge and methods for making such signs have been disclosed in several patents. In general, these signs are made by using two or three glass plates with a groove or cavity corresponding to the desired display formed in one or two of the plates. When three plates are used, the groove or cavity can be formed in the intermediate plate which is disposed between a pair of outer plates. Alternately, the intermediate plate can be omitted with the groove or cavity formed in an interior surface of one or both of the outer plates. The cavity is hermetically sealed and communicates with a set of electrodes. In the manufacturing process, the cavity is evacuated and a quantity of ionizable gas, such as neon, is introduced into the cavity through a gas charging port. The gas is then ionized by applying a voltage across the electrode set. The ionized gas, in turn, causes the display to illuminate.

SUMMARY OF THE INVENTION

This invention relates to a luminous gas display and a method of manufacturing such a display.

As described above, it is known to evacuate the space between the plates of a luminous gas display. As described above, in an effort to reduce the thickness of such displays, it is known to omit the intermediate plate and form the display channels in the interior surface of one or both of the outer plates. The channels are shaped to conform to the desired symbols. Alternately, ridges can be formed in the surface of one of the plates. A sealant is applied about the perimeter of one of the plates and the plates are assembled. By making one, or both, of the plates sufficiently thin, atmospheric pressure will urge the center of the plates toward one another as the space therebetween is evacuated, causing one or both of the plates to be slightly bowed. As the edges of the channels or the crest of the ridges contact the bowed plate surface, a channel for containing the ionizable gas is formed. The channel is then charged with the ionizable gas.

To further enhance the display, it is also known to apply a light emitting phosphor coating to the channel. A small quantity of Mercury (Hg) is introduced into the channel. When the gas in the channel is ionized, the Hg is heated and vaporizes. The Hg vapor produces Ultra-Violet (UV) radiation which excites the phosphor to produce a brighter and/or more colorful display. Additionally, use of different phosphors can provide a variety of colors for the display.

If a seal is not formed along the entire length of the channel, the Hg vapor may leak into the evacuated portion of the display. Because Hg vapor is a condensing gas, when the Hg vapor contacts the cold portions of the display panels, the Hg vapor reverts to its liquid state and condenses upon the interior surface of the panels. Once out of the channel, the Hg is not heated by the ionized gas and thus will remain in its liquid state. The loss of Hg vapor from the channel can cause weak illumination of portions of the display. Eventually, all of the Hg vapor may escape from the channel and condense upon the panels, removing the source of UV radiation for exciting the phosphor coating in the channel. Accordingly, it would be desirable to provide a luminous gas display which includes a seal formed along the edge of the gas charged channel which would prevent the Hg vapor from escaping from the channel.

The present invention contemplates a luminous gas discharge display including a first plate and a second plate adjacent to the first plate. The display further includes a layer of sealing material disposed between the plates and forming a seal therebetween. At least one channel is formed in an interior surface of at least one of the first and second plates. The channel contains an ionizable gas and a pair of electrodes communicate with the channel. The electrodes are operable to ionize the gas in the channel to produce a gas discharge display.

The invention further contemplates that at least one of the first and second plates is transparent and further that the sealing layer also is transparent. In the preferred embodiment, the plates are formed from glass and the dielectric layer is formed from a sealing glass compound, such as solder glass. Additionally, the thermal coefficient of expansion for the sealing layer is approximately the same as the thermal coefficient of expansion for both of the display plates. The sealing layer can extend across the entire interior surface of at least one of the plates or the sealing material can be deposited upon the plate which includes the channel with a band of the sealing material adjacent to the perimeter of the channel.

The present invention also contemplates a process for fabricating a luminous gas discharge display which includes forming at least two plates. At least one channel is formed in one of the plates. A layer of light emitting phosphor is deposited in the channel and a layer of sealing material is applied to at least one of the plates and cured thereon. The plates are then assembled with the channel and the layer of sealing material between the plates to form a plate assembly. The plate assembly is heated to a joining temperature, which is a function of the sealing material and the glass forming the plates, and maintained at the temperature for a period of time sufficiently long to cause the dielectric material to join the plates together and form a seal therebetween. A source of liquid mercury can be deposited in the channel. The channel is then evacuated and refilled with an ionizable gas. The channel is then sealed and the mercury is activated. In the preferred embodiment, an ampule of mercury is placed in the channel and the mercury activated by being released from the ampule once the channel is sealed. Either a pair of internal electrodes which communicate with the channel are installed before the plates are assembled, or a pair of external electrodes which communicate with the channel are installed after the plate assembly is joined.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
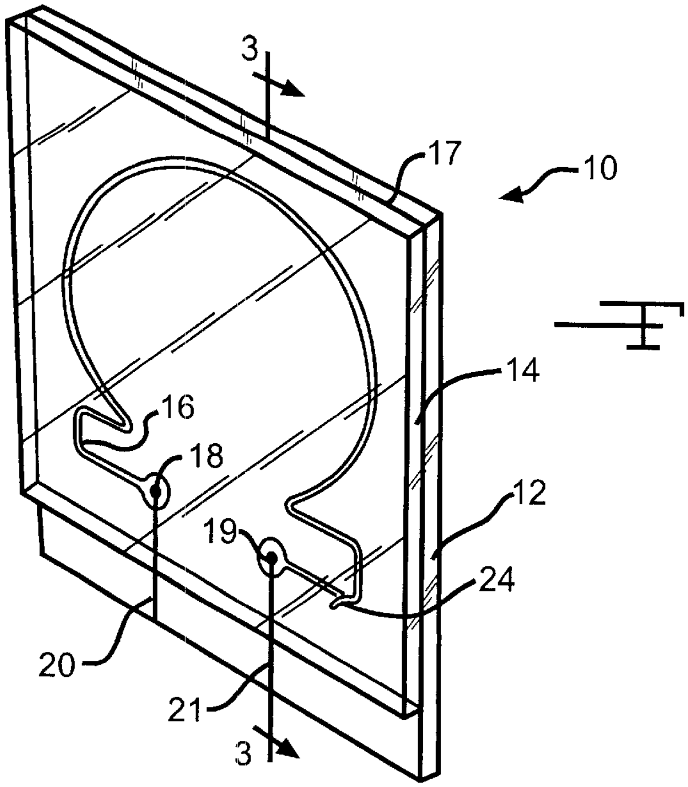
FIG. 1 is an isometric view of a luminous gas discharge display in accordance with the present invention.

Referring now to the drawings, where like reference characters represent like elements, there is illustrated in FIG. 1, a luminous gas discharge display 10. In considering the figures, it will be appreciated that for purposes of clarity, certain details of construction are not provided in view of such details being conventional and well within the skill of the art once the invention is disclosed and explained. The luminous gas discharge display 10 includes a front plate 12 which is opposite to a back plate 14. The front and back plates 12 and 14 may be formed of most any suitable thickness and size to withstand temperatures and vacuum levels of gas discharge. At least the front plate 12 is formed of a transparent material such as glass or plastic or the like. In a preferred embodiment, both the front and back plates 12 and 14 are formed of soda lime glass. In the preferred embodiment, the glass plates 12 and 14 contain at least ten percent soda by weight. The front and back plates 12 and 14 may be of the same thickness or of a different thickness.

Figure 2:
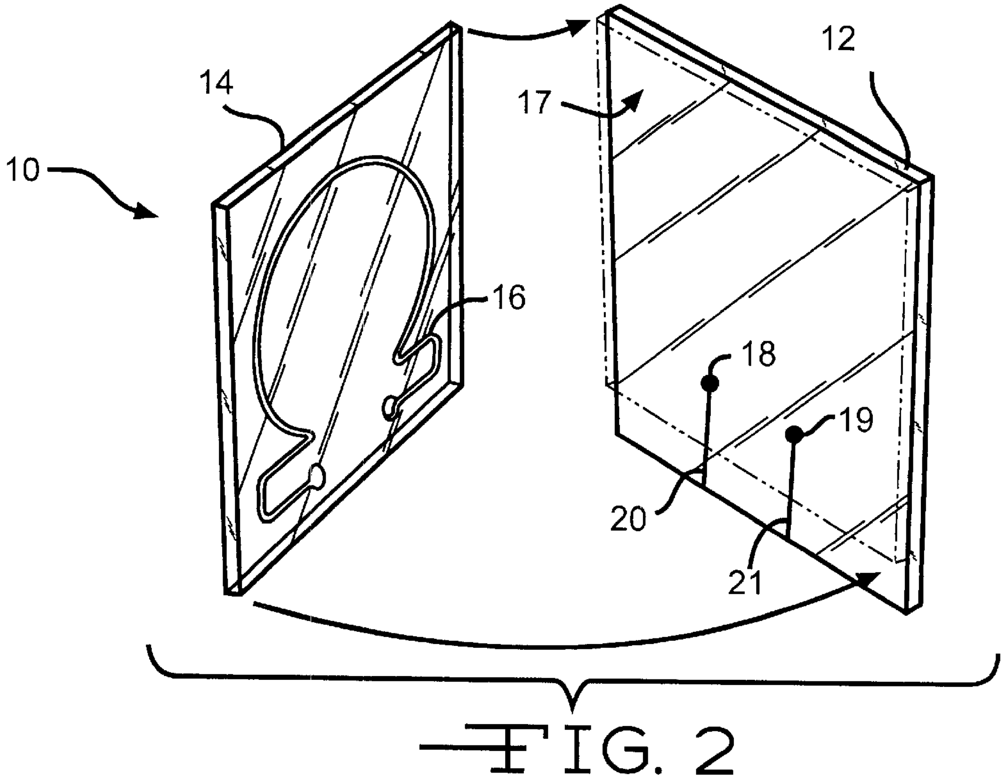
FIG. 2 is an exploded isometric view of the gas discharge display of FIG. 1.

As best seen in FIG. 2, at least one of the plates 12 and 14 includes a channel 16 formed in an interior surface thereof. The channel 16 defines a gas discharge path and may be of most any suitable configuration or length. The channel 16 may be in the shape of a continuous tortuous path or in the shape of multiple independent paths configured to appear as a reference character such as letters or numbers. For illustrative purposes, the channel 16 is shown in FIGS. 1 and 2 in the shape of the Greek letter "Ω". It will be appreciated that to facilitate the appearance of separate and distinct figures or characters, the display 10 may include an optional opaque masking layer (not shown) applied to one or more of the plates 12 and 14 as well known in the art to mask the sections of the channel 16 interconnecting the figures or the characters.

Figure 3:
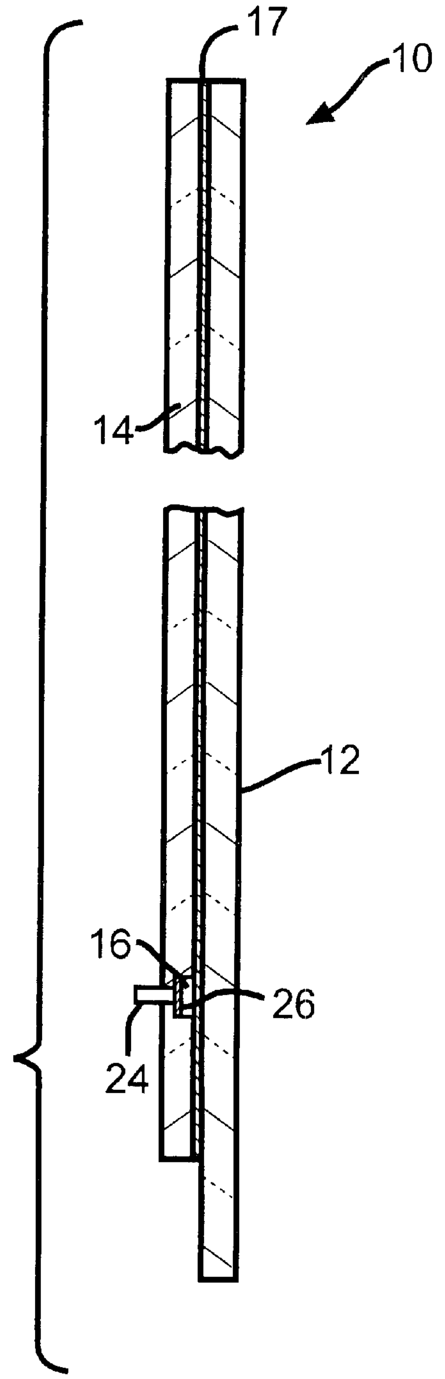
FIG. 3 is a cross sectional view of the display of FIG. 1 taken along line 3—3 in FIG. 1.
Figure 4:
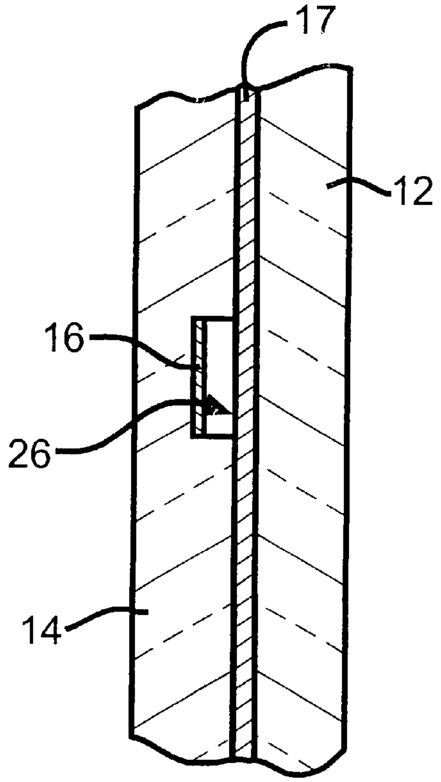
FIG. 4 is an enlarged partial cross sectional view of the display of FIG. 1.

The channel 16 may be formed in the interior surface of one or more of the plates 12 and 14 by any conventional means known in the art. For example, the channel 16 may be mechanically formed by sand blasting. Alternately, the channel 16 may be formed by a chemical process, such as acid rotting, or mechanical routing to provide narrow channels 16 ranging in length up to the allowable limit specified by electrode manufacturers, and of any depth consonant with the glass thickness. In the preferred embodiment, mechanical routing is utilized to form the channel 16, as described in U.S. Pat. No. 5,911,613, which is incorporated herein by reference As shown in FIGS. 3 and 4, a transparent sealing layer 17 formed from an electrically insulative sealing material is disposed between the front and back plates 12 and 14. As will be explained below, the sealing layer 17 forms a hermetic seal between the front and back plates 12 and 14. In the preferred embodiment, the sealing layer 17 is formed from a sealing glass, such as solder glass. A solder glass layer 17 is formed from a glass frit having a high lead oxide content, such as a frit formed from lead-borate glass which has a lead content of approximately 75 percent by weight.

The sealing layer 17 is formed by a conventional process, such as, for example, printing or spraying the solder glass onto one of the plates 12 and 14, forming a preform of the solder glass and placing the preform upon one of the plates or by Chemical Vapor Deposition (CVD) directly onto the surface of one of the plates. In the preferred embodiment, the solder glass is applied to the interior surface of the front plate 12 while the channel 16 is formed in the interior surface of the back plate 14. Alternately, the solder glass could be applied to the interior surface of the back plate 14. However, application of the solder glass to the back plate 14 would require masking to prevent the solder glass from being applied to any surfaces of the channel 16. The sealing layer 17 joins the front plate 12 to the back plate 14 in a totally intimate manner such that the display 10 is effectively a single plate of glass.

The sealing material is selected having a coefficient of expansion which is similar to the coefficient of expansion for the materials forming the front and back plates 12 and 14 so that the seal is maintained when the plates 12 and 14 are subjected to thermal expansion and contraction. For the glass and solder glass used in the preferred embodiment, the coefficient of expansion is approximately $90\times10^{-8}$ cm/cm. While the sealing layer 17 can have any thickness, in the preferred embodiment, the sealing layer 17 is within the range of one to six mils (0.001 inches to 0.006 inches) in thickness.

The display 10 further includes at least two internal electrodes 18 and 19 which communicate with the channel 16. The electrodes 18 and 19 are of a conventional design and energize an ionizable gas which is contained within the channel 16. As illustrated in FIGS. 1 and 2, the electrodes 18 and 19 are located between the plates 12 and 14. Electricity to power the display 10 is supplied to the electrodes 18 and 19 by a transformer (not shown) through lead wires 20 and 21 as is well known in the art. In the preferred embodiment, the electrodes 18 and 19 and their associated leads 20 and 21 are formed by a conventional process, such as printing, vacuum deposition, sputtering or CVD, upon the interior surface of the front plate 12. Accordingly, the electrodes 18 and 19 are masked when the sealing layer 17 is applied to the front plate 12 while the sealing layer 17 can be deposited directly over the leads 20 and 21. Alternately, the electrodes 18 and 19 and leads 20 and 21 can be deposited onto the sealing layer 17 after the sealing layer 17 is applied to the front plate 12 by a conventioal process such as, printing, vacuum deposition, sputtering or CVD.

As described above, the channel 16 is filled with an ionizable gas, such as, for example, mercury, xenon, krypton, neon or argon, or mixtures of ionizable gases. As best seen in FIG. 3, a charging port 24, which comprises a glass tube extending through the back panel 14, communicates with the channel 16. After the display panel 10 has been assembled, any gases within the channel 16 are evacuated through the charging port 24 and then the channel 16 is refilled with a selected ionizable gas or mixture of such gases. Typically, the charging port 24 can be sealed by a "tip off" operation during which the glass tube is heated and stretched to pinch and separate the tube and thus form a seal. While the charging port 24 is illustrated as extending through the back plate 14, it also be appreciated that the invention can be practiced with the charging port 24 extending through the front plate 12.

To further enhance the display 10, a light emitting phosphor 26 can be applied to the interior surface of the front plate 12, to the interior surface of the back plate 14, or to the interior surface of the channel 16, as shown in FIG. 4. When the display 10 includes a light emitting phosphor 26, a small amount of liquid Hg is included in the channel. The natural vapor pressure of the Hg fills the channel 16 with Hg in its gaseous state. The resulting Hg vapor emits UV radiation when excited by the electrical discharge through the channel 16. The UV radiation excites the phosphor, causing the phosphor to emit a colored light. The color of the emitted light is determined by the particular phosphor utilized. The phosphor 26 changes the light color of the display 10 as required to improve the aesthetics of the display.

The light-emitting phosphor 26 may be of almost any suitable color and type as is well known in the art. To deposit the phosphor 26 in a shallow channel, spray-deposition or silk screen printing is most appropriate, as in the case of the preferred embodiment. Alternately, manual brushing the phosphor into the channel or a technique known as "settling" may be used. Settling is accomplished by filling the channel 16 with a suspension of phosphor and a vehicle such as denatured alcohol and allowing evaporation to occur, during which the phosphor 26 is deposited upon the walls of the channel 16.

Figure 5:
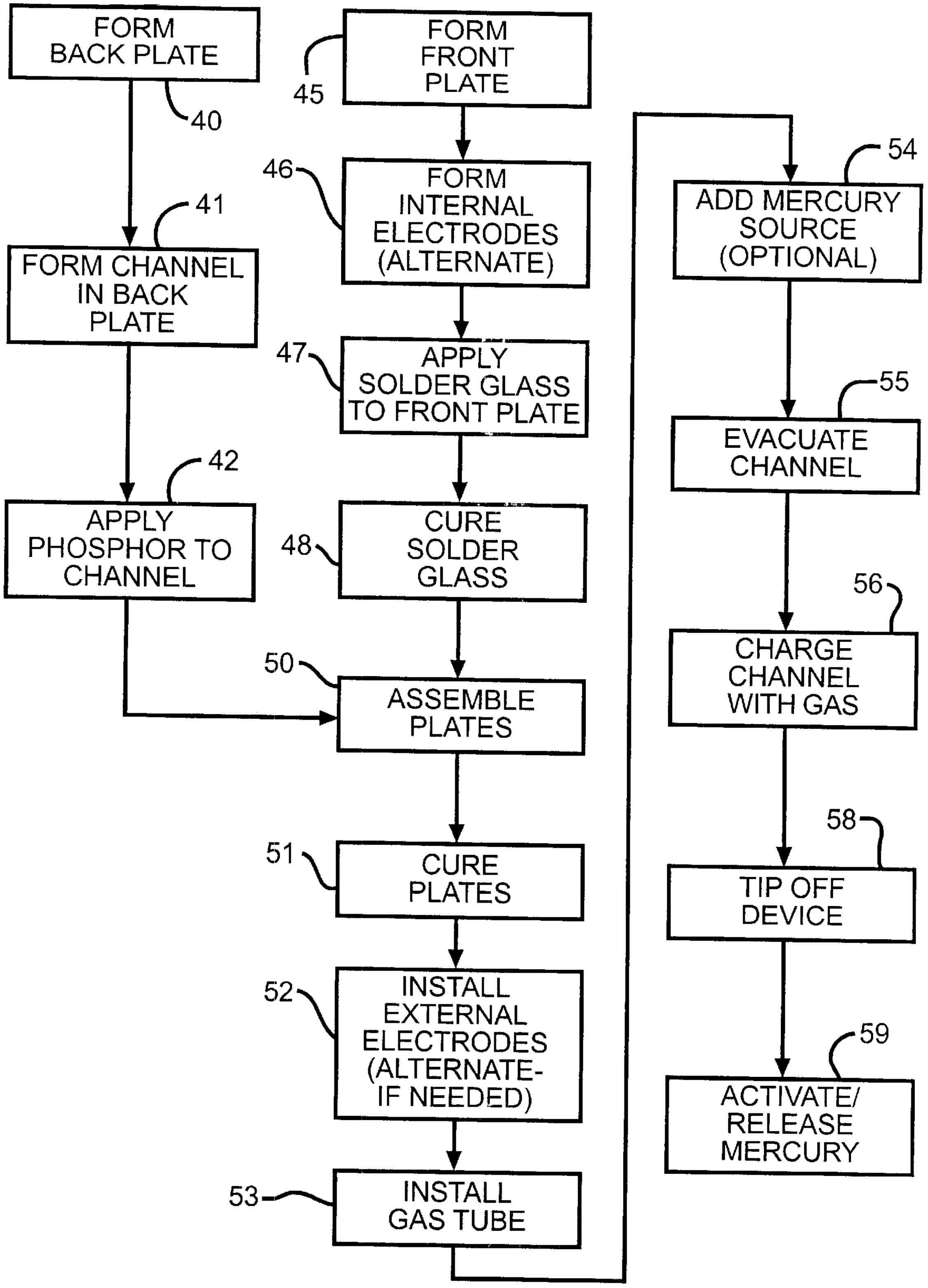
FIG. 5 is a flow chart for a process for manufacturing the gas discharge display of FIG. 1.

The present invention also contemplates a process for fabricating the display 10. The process is illustrated by the flow chart shown in FIG. 5. In functional block 40 the back plate is formed. Then, in functional block 41, at least one channel is formed by mechanical or chemical methods in the interior surface of the back plate. It will be appreciated that the channel also can be formed in interior surface of the front plate (not shown) or in the interior surfaces of both the front and back plates (not shown); however, forming the channel in both plates complicates the application of the sealing layer. A layer of light emitting phosphor is deposited in the channel in functional block 42.

Concurrent with forming the front plate, a front plate is formed in functional block 45. If internal electrodes are utilized for the display, a pair of electrodes and associated leads are deposited upon the interior surface of the front plate by a commercially known process as shown in functional block 46. A layer of sealing material, which is solder glass in the preferred embodiment, is applied the interior surface of the front plate in functional block 47 by a conventional process, such as printing or spraying. If internal electrodes and leads were deposited upon the front plate in functional block 46, the electrodes are masked during the application of the sealing material. Alternately, the sealing material can be applied to the back plate; however, masking of the channel would be required to keep the sealing material out of the channel. The sealing material is cured in functional block 48 by heating the front plate in a curing oven for a time period. The curing bonds the sealing material to the front plate while also transforming the sealing material into a transparent state. The curing temperature and time period are selected to correspond to the particular sealing material utilized and the stress requirements of the glass forming the back plate. In the preferred embodiment, the front plate and solder glass layer are cured at about 650° C. for 8 to 16 hours. The front plate is allowed to cool before proceeding to the next step.

The front and back plates are assembled in functional block 50. The plates are aligned and clamped together in a jig such that any mirror image channels in both plates are aligned. The plates and alignment jig are placed in a curing oven in functional block 51. The plates are heated sufficiently to soften the sealing layer. The assembled plates and jig are then retained in the curing oven for a time period to cure the plates and sealing layer. The curing temperature and time period are selected to correspond to the particular sealing material utilized and the stress requirements of the glass forming the front and back plates. In the preferred embodiment, softening occurs at approximately 650° C.; however, a specific sealing material may require a different temperature. In the preferred embodiment, curing takes from 8 to 16 hours. Again, a different sealing material or different stress requirements of the glass plates may require a different curing temperature and time. The heating and curing joins the dielectric material to the interior surfaces of both of the plates and forms a seal therebetween. After curing, the plates are allowed to cool to room temperature and then removed from the assembly jig.

If external electrodes are utilized, the electrodes are added to the assembly in functional block 52. A tube which communicates with the channel is attached to the assembly in functional block 53 to form a gas charging port. A source of liquid Hg is added to the channel in functional block 54; however, this step is optional. The channel is then evacuated through the charging port in functional block 55 by a conventional method, such as mechanical or cryogenic pumping. In functional block 56, the channel is charged through the charging port with an ionizable gas. The charging port is tipped off, or sealed, in functional block 58. The source of mercury is released into its gaseous state in functional block 59.

Figure 6:
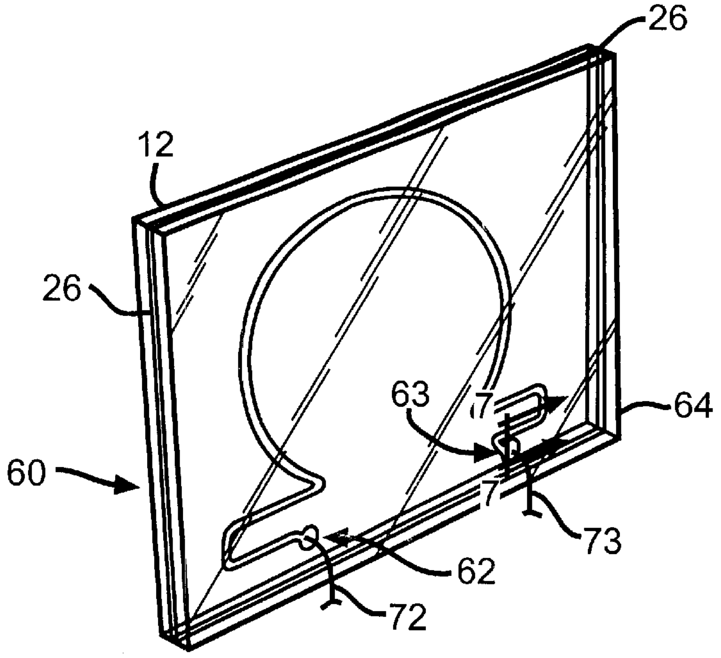
FIG. 6 is an isometric view of an alternate embodiment of the gas discharge display shown in FIG. 1 which has external electrodes.
Figure 7:
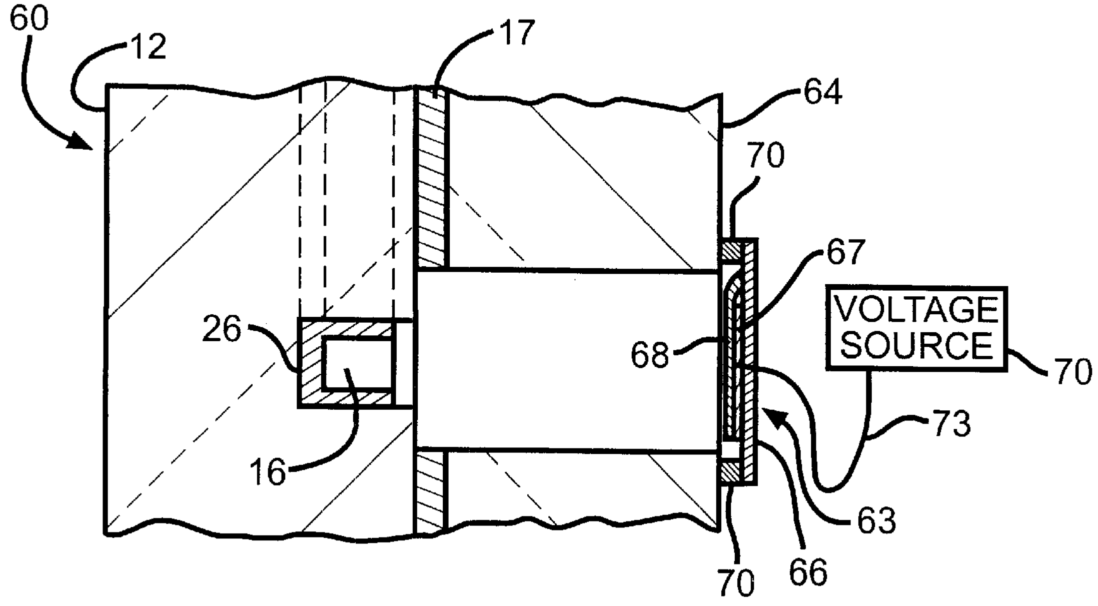
FIG. 7 is a cross sectional view of the display of FIG. 6 taken along line 7—7 in FIG. 6.

An alternate embodiment 60 of the gas discharge display is illustrated in FIGS. 6 and 7. Components in FIGS. 6 and 7 which are similar to components shown in FIG. 1 through 4 have the same numerical designators. The alternate display 60 includes external electrodes 62 and 63 attached to a back plate 64. Additionally, the back plate 54 has the same dimensions as the front plate 12. The external electrodes 62 and 63 have similar structures. Accordingly, details are only shown for one of the electrodes 63 in FIG. 7. Each of the external electrodes 62 and 63 includes an outer substrate 66, an intermediate conductive layer 67 and an inner emissive layer 68. The electrodes 62 and 63 are secured to the exterior surface of the back plate 64 with an annular bead of sealing material 70. An aperture 72 formed through the back plate 64 and sealing layer 17 provides communication between the electrode 63 and the channel 16. The external electrodes 62 and 63 are connected to a voltage source 70 by leads 72 and 73. Further details of the external electrodes 62 and 63 are included in U.S. Pat. No. 5,892,326, which is incorporated herein by reference. An alternate structure for external electrodes is disclosed in U.S. Pat. No. 4,839,555, which also is incorporated herein by reference.

As shown in FIG. 7, the light emitting phosphor 26 extends across the bottom of the channel 16 and onto the sides thereof. It will be appreciated that the phosphor also can extend onto the sides of the channel 16 for the display 10 illustrated in FIGS. 1 through 4.

It will be appreciated that while the preferred embodiment has been illustrated and described in terms of two plates with a channel formed in at least one of the plates, the invention also can be practiced with three or more plates sandwiched together with a layer of dielectric material disposed between each of the layers. For a three layer design, the channel would be formed in the middle or intermediate plate.

The solder glass layer forms a seal which contains the ionizable gas and Hg vapor within the channel 16, thus eliminating loss of the Hg vapor from the channel 16 which could cause weak illumination of portions of the display. Additionally, the use of a sealing layer between the front and back plates negates the need to flex the plates to form a seal. Accordingly, a larger surface area of the plates is available for forming the channel, allowing a larger message to be displayed upon the same sized plates. Furthermore, the solder glass layer eliminates the gap between the front and back plates in prior art displays which thereby eliminates the formation of Newton rings in the display.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the sealing layer 17 has been illustrated and described as extending across the entire interior surface of the front and back plates 12 and 14, it will be appreciated that the invention also can be practiced with the sealing layer 17 being only adjacent to the perimeter of the channel 16 and having sufficient width to form a seal (not shown). Additionally, while the invention has been described and illustrated in connection with a luminous displays 10 and 60, it is recognized that the invention can take other forms. For example, the invention may be back filled with xenon or argon gas and the like and supplied with light-emitting phosphors on the surface of the channel 16 to be used for general and commercial lighting, as light source for photographic or x-ray viewing, or depending upon the thickness or size of the unit, for any general or specialized lighting requirement for which it may be appropriate.

What is claimed is:

1. A luminous gas discharge display comprising:

a flat first plate;

a flat second plate adjacent to said first plate;

at least one channel formed in an interior surface of at least one of said first and second plates, said channel containing an ionizable gas;

a layer of sealing material disposed between said first and second plates, said sealing layer extending along the edges of the entire length of said channel to form a seal between said first and second plates whereby said seal retains said gas within said channel; and a pair of electrodes communicating with said channel.

2. The display according to claim 1 wherein at least one of said first and second plates is transparent and further wherein said sealing layer also is transparent.

3. The display according to claim 2 wherein one of said plates is formed from glass.

4. The display according to claim 2 wherein one of said plates is formed from a plastic.

5. The display according to claim 3 wherein said layer of sealing material is formed from a glass compound.

6. The display according to claim 5 wherein said glass compound includes solder glass.

7. The display according to claim 5 wherein both of said plates have a first coefficient of thermal expansion and said glass compound forming said sealing layer has a second coefficient of thermal expansion which is approximately the same as said first coefficient of thermal expansion.

8. The display according to claim 5 wherein said layer of sealing material extends across the entire interior surface of at least one of said plates.

9. The display according to claim 5 wherein said sealing material is deposited upon said plate having said channel with said sealing material adjoining the edges of said channel and extending along the entire length of said channel.

10. The display according to claim 5 wherein said electrodes are mounted external to the display and communicate with said channel.

11. The display according to claim 5 wherein said electrodes are mounted between said plates and communicate with said channel.

12. The display according to claim 5 wherein a layer of a light emitting phosphor is deposited upon a surface of said channel and further wherein said channel has mercury deposited therein.

* * * * *